United States Patent [19]

Noel

[11] Patent Number: 5,260,080
[45] Date of Patent: Nov. 9, 1993

[54] METHOD OF PROCESSING SKIMMED MILK

[75] Inventor: Roland Noel, Vidauban, France

[73] Assignee: Societe Vidaubanaise d'Ingenierie, Vidauban, France

[21] Appl. No.: 854,647

[22] PCT Filed: Jan. 18, 1991

[86] PCT No.: PCT/FR91/00028
§ 371 Date: Jul. 8, 1992
§ 102(e) Date: Jul. 8, 1992

[87] PCT Pub. No.: WO91/10366
PCT Pub. Date: Jul. 25, 1991

[30] Foreign Application Priority Data

Jan. 19, 1990 [FR] France .................. 90 00633

[51] Int. Cl.⁵ .............................. A23C 9/00
[52] U.S. Cl. ..................... 426/239; 426/491
[58] Field of Search .......... 426/239, 491, 495; 204/182.4, 186

[56] References Cited

U.S. PATENT DOCUMENTS 3,433,726 3/1969 Parsi et al. ............... 426/239
4,844,923 7/1989 Herrmann ............... 426/239

FOREIGN PATENT DOCUMENTS 165105 12/1985 European Pat. Off. .
173999 3/1986 European Pat. Off. .
2418627 9/1979 France .
2433304 3/1980 France .
2514615 4/1983 France .
470141 3/1969 Switzerland .
2100289 12/1982 United Kingdom .

OTHER PUBLICATIONS

Chemical Abstracts vol. 27 1933, p. 3534 Colombus, Ohio, US J. Kato, "Manufacture of casein and lactose by electrodialysis" & J. Soc. Chem. Ind. Japan 36, Suppl. binding 158-9 (1933).

Primary Examiner—George Yeung
Attorney, Agent, or Firm—Sixbey, Friedman, Leedom & Ferguson

[57] ABSTRACT

Skimmed milk is subjected to acidification by electrodialysis in one or two successive three-compartment electrodialyzers. The resulting milk is at a pH of 4.5 or 2.8. Milk at a pH of 4.5 may be used for obtaining refined casein as a substitute for rennin casein. Milk at a pH of 2.8 when sterilized and filtered to selectively extract a whey permeate and serum proteins becomes casein in its natural state soluble at a pH in the range 2.8 to 4, which casein may be neutralized in a two-compartment electrodialyzer. The acid permeate is passed over a strong cationic resin in order to be used as an acid agent in the initial electrodialyzers.

9 Claims, 2 Drawing Sheets

METHOD OF PROCESSING SKIMMED MILK

The milk industry covers all methods of processing milk for separating out the various constituent parts thereof and enabling each to be made the most of individually.

The present invention relates to the milk industry and more particularly to the skimmed milk industry and to the two main constituent parts of skimmed milk: casein and whey.

BACKGROUND OF THE INVENTION

The most valuable application of casein is in the food industry. It is used in an attempt to increase the nutritive quality of foodstuffs. However, such utilizations are often limited to adding edible fillers.

The main constituent part of whey is lactose for which there are numerous outlets, not only in the food industry, but also in the pharmaceutical or parapharmaceutical industry. Whey also includes proteins (serum proteins) which may also be of commercial value.

There are several ways of separating casein from whey. The method by which the largest volume of milk is processed is the "acid" method which consists in incorporating an acid (in particular hydrochloric acid) in milk in order to reach a pH (of about 4.5) at which the casein precipitates out and may be separated from the remaining whey. This technique suffers from numerous drawbacks. Regardless of the reagents used (hydrochloric acid or sulfuric acid), they are never totally free of heavy metals and other toxic substances which thus get into the milk. In addition, adding a strong acid into a high quality biological medium is an operation which is esthetically unsatisfactory and it also gives rise to ionic destabilization of the casein by increasing the ionic force in the medium. The resulting casein has therefore lost its phospho-calcium characteristics and can no longer constitute natural casein or "caseinogen", i.e. casein which has retained all its properties.

A second technique consists in obtaining casein by fermenting milk in order to produce an acid medium by generating lactic acid. Although, as a biotechnique, this technique is of higher quality than the preceding technique, fermentation profoundly modifies the structure of the proteins present in casein. Here again, the resulting casein cannot be considered as being in its natural state.

Mention may also be made of another technique, in which casein is produced by means of enzymes: the enzyme is casein rennin. As in the preceding case, the enzyme reaction has an effect on the protein structure of the casein phase. In addition, the casein is insoluble which makes subsequent processing or utilization more difficult.

All of these methods of production operate by adding a foreign body to milk, and this constitutes a first reason why it is impossible to isolate milk casein without modifying its structures.

A last technique consists in acidifying milk by treatment on ion exchanging resins. In principle, this technique is advantageous in that ideally it would avoid any foreign bodies being added to the milk, however its implementation suffers from numerous drawbacks. Firstly there is a major loss of substance retained by the resins which quickly become clogged and saturated. The process cannot be controlled from the microbiological point of view and resin regeneration by means of strong acids allows toxic substances such as heavy metals to get into the milk.

In addition to the drawbacks briefly outlined above of these methods with respect to casein, they also have non-negligible effects on the other product, namely is whey, making it more difficult or more expensive to make use of it.

The inorganic matter content of whey obtained by the acid method increases in proportion to the quantity of foreign acid added. The whey is thus unsuitable for direct utilization and in order to obtain a product that is of commercial value it is necessary to implement complex technologies (deionizing followed by filtering and concentration processes).

The presence of lactic acid in whey obtained as a by-product of producing lactic casein makes the whey unsuitable for any subsequent processing technology. In addition, lactic fermentation consumes lactose, thereby reducing the remaining quantity that is potentially available for constituting a valuable product.

Finally, whey obtained by enzyme processing requires major heat treatment in order to inhibit the residual enzyme activity, said heat treatment spoiling the qualities of the serum proteins which also constitute a valuable constituent part of whey.

The present invention seeks to provide a method of processing milk making it possible to extract its various constituent parts optimally, i.e. firstly retaining their initial properties and secondly under conditions of extraction that are commercially profitable.

SUMMARY OF THE INVENTION

To this end, the present invention thus provides a method of processing skimmed milk to extract the various constituent parts therefrom, the method including a first phase in which the milk is acidified by low temperature electrodialysis in a three-compartment electrodialyzer in order to obtain a pH of about 5 or about 2.8. In order to make industrial control of the method more reliable, the said electrodialyzer is used for obtaining limited acidification only, e.g. up to pH 5, and additional acidification of at least a fraction of a batch from the first electrodialyzer is obtained in a second three-compartment electrodialyzer in order to obtain a pH of about 2.8.

The effect of the first stage is to eliminate free cations (sodium, potassium, magnesium, ... ) from the milk by cation exchange through the membranes of the three-compartment electrodialyzer. The cations are replaced by ions of hydrogen. In this respect, it should be observed that only the free cations (or those associated with weak acids) are extracted from the milk. Calcium bonded or combined with organic phosphate and casein is not extracted. This preservation is important since it constitutes the manner in which the essential properties of casein in its natural state are safeguarded.

A second advantage of this acidification lies in the improved microbiological protection it confers on the milk during the subsequent stages of the process.

Two-stage acidification is advantageous from the point of view controlling the reactions. When casein is at a pH of about 4.6, it is at a sensitive point of the structure (the isoelectric point) where it tends to flocculate. Nevertheless it is appropriate to raise it to around this point so as to enable it to be extracted from the milk. In order to achieve this result while avoiding flocculation and precipitation in the electrodialysis cells, the method of the invention proposes proceeding in two stages, with the second stage being applied to a fraction of the processed milk, thereby limiting the danger of technological blocking of the electrodialysis at the moment when the isoelectric point of the casein is reached. The second electrodialysis stage takes the milk from pH 5 to about pH 2.8 without too much difficulty since by using a smaller quantity of milk this point is passed through rapidly and should coagulation arise the ability of the proteins to be amphoteric enables the precipitate to redissolve as soon as the pH drops.

In this context, it may be observed that it is not advantageous to lower the pH to a value of less than 2.8 since the operating yield of the electrodialyzer is greatly affected thereby, and the phospho-calcuim equlibrium of the casein is threatened.

In its least elaborate form, the method of the invention may consist in mixing together acid milk obtained by two electrodialyzers so that the final mixture is maintained under conditions of pH and temperature for a determined length of time suitable for extracting casein by a conventional method. In this case it is important to take precautions to ensure that the mixture is made perfectly uniform while it is being prepared so as to avoid forming pH gradients which could lead to local conditions being displaced from the isoelectric point, thereby reducing the overall quantity of substance extracted and encouraging minor hydrolyzes during subsequent heat treatments, thereby spoiling the taste of the product.

Casein produced under these conditions cannot be said to be in its natural state, but it certainly presents qualities that are better than those of caseins obtained by the acid method. In particular, since the proteins have not been subjected to aggressive acid attack, their structure is less disturbed. Consequently, the observed losses are lower and the throughput is better, and in addition the casein retains the major portion of its phospho-calcium bonds.

It is advantageous to observe that the whey which results from this casein production has a pH of around 4.6 and is partially deionized by passing through the electrodialyzers, which whey can be further deionized by being passed over a strong cationic resin. The highly decationized whey then has a pH lying in the range 1 to 2. It can then usefully be employed as an acid medium in the electrodialyzers, from which it comes out at a pH of greater than 5 after loosing a large portion of its anions. This neutralized whey is more easily made use of than an acid whey conventionally derived from the acid method of producing casein. It will be understood that this feature of the method of the invention helps optimize production, commercially speaking.

In a more elaborate form of the method of the invention, all of the processed milk is subjected to electrodialysis in a single stage of a three-compartment electrodialyzer, producing milk with a pH of about 2.8. It may, however, be advantageous to perform this acidification in two stages.

This can be done in two different ways. The first way consists in taking milk at a pH of 5 from the first stage and in enhancing passage through the isoelectric point in the second three-compartment electrodialyzer by recycling all of the batch therethrough until a pH of about 2.8 is obtained. The second way consists in preparing a batch of milk with a pH of 5 and in mixing it prior to the second electrodialyzer with milk at a pH of 2.8 in order to obtain a batch of milk having a pH of about 4 at the inlet to the second electrodialyzer.

The milk processed in this way is subjected to fractioned filtering whereby lactose is extracted in a first ultra-filtering stage, serum proteins are extracted in a second micro- and dia-filtering stage, and residual lactose is extracted in a final stage of concentration by ultrafiltering.

After leaving this filtering stage, the residue is essentially constituted by casein in its natural state, soluble at a pH of about 3 to 4, given cation losses during filtering and the addition of water during diafiltration.

This residue is neutralized to obtain products having a pH of 5 to 7 by means of a two-compartment electrodialyzer in which the milk is deanionized. The passage of the casein through the isoelectric point can be accelerated by adding a basic solution.

The filtrate from the ultrafiltering stages is also deionized firstly by means of a strong cationic resin and secondly by means of three-compartment electrodialyzers in which this permeate is inserted as the acid medium (pH in the range 1 to 2) and from which it is extracted both neutralized and deionized.

It is then in a condition which is quite ready for immediate industrial use (in particular primary lactose crystallization).

The filtrate from the micro- and dia-filtering stages is concentrated in serum proteins to about 35% (relative to total dry matter), thereby enabling it to be used directly.

BRIEF DESCRIPTION OF THE DRAWINGS

An embodiment of the invention is described by way of example with reference to the accompanying drawings, in which.

DETAILED DESCRIPTION

Figure 1:
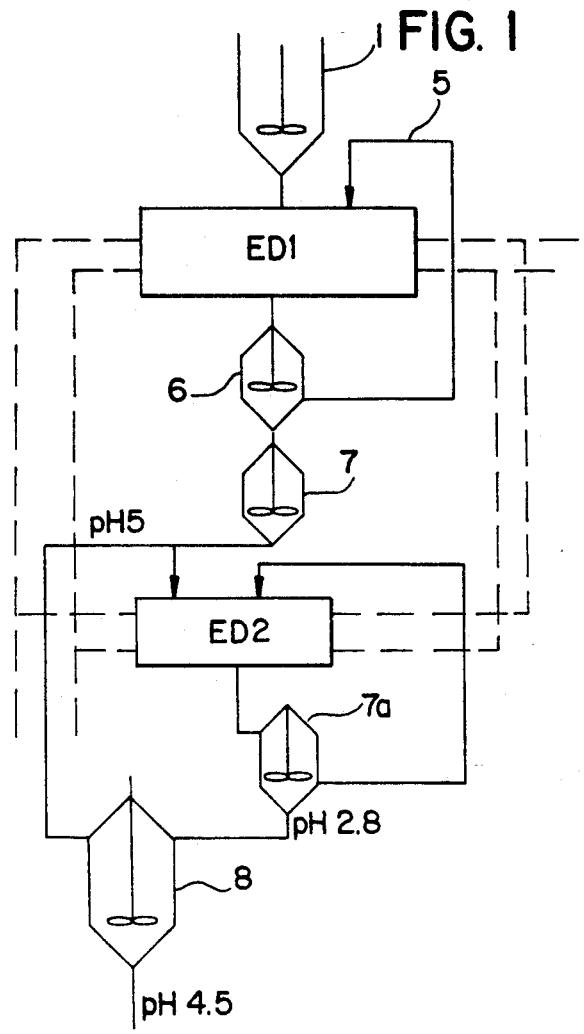
FIG. 1 shows the stage during which the milk being processed is acidified.
Figure 1A:
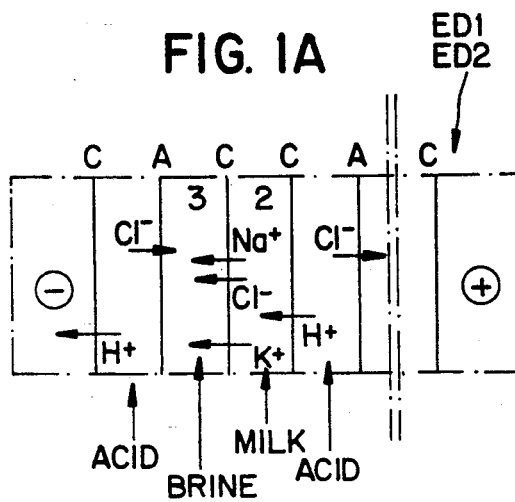
FIG. 1A is a diagram of a cell in a three-compartment electrodialyzer.

In FIG. 1 reference 1 designates a tank containing a batch (a fixed volume) of skimmed milk which is preferably maintained at 4° C., if only to limit microbiological development. This quantity of milk has a pH of about 6.5 to 7, i.e. it is close to being neutral. The milk is taken from the tank 1 and inserted in an electrodialyzer ED1 for acidification by exchanging cations with ions of hydrogen. FIG. 1A is a diagram showing the ion phenomena which take place in this type of apparatus which is known per se. Briefly described, such a so-called "three-compartment" electrodialyzer comprises a stack of anionic membranes A and cationic membranes C with two consecutive cationic membranes C being bracketed by two anionic membranes A. This stack is placed between two electrodes such that under the application of direct current, the cations in the liquids contained in the compartments tend to migrate towards the cathode (−) while the anions tends to migrate towards the anode (+), until they are retained respectively by an anionic or a cationic membrane, as the case may be, which prevents further migration.

In order to acidify milk flowing between the two cationic membranes in the compartment 2, this flow is bracketed by brine on the cathode side (compartment 3) and acid on the anode side (compartment 4) so that the brine is enriched with cations from the milk which is in turn enriched with hydrogen ions from the acid solution. This makes it possible to acidify the milk without getting foreign cations in the milk. In addition, the cations which leave the milk are generally the cations (calcium, sodium, potassium, magnesium, . . . ) of salts which are not bound to casein proteins (the phosphocalcium salts). The ionic forces are not strong enough to break these bonds. In contrast, the electrodialysis serves to eliminate heavy metals which may be present in the milk due to pollution in animal feed (in particular radioactive elements). The flowing acid medium may be hydrochloric acid.

This electrodialysis of the batch takes place by the milk being recycled as indicated by path 5 until a pH is obtained in a tank 6 at a value of about 5. This presents the isoelectric point of casein (about pH 4.6) being reached and thus prevents any deposit being precipitated on the membranes of the electrodialyzer. The batch is then transferred into a buffer tank 7.

A portion of this milk at pH 5 is then caused to flow through a second three-compartment electrodialyzer ED2 through which it is recycled rapidly in order to bring its pH to about 2.8. The casein is passed through its isoelectric point as quickly as possible inside the electrodialyzer ED2 so as to limit flocculation and the risks of the system being clogged. Given the amphoteric nature of the proteins, any deposits that may occur inside the electrodialyzer ED2 are dissolved by the milk as soon as it has passed the isoelectric point. Thus a certain fraction (e.g. 20%) of the initial quantity of milk is taken to a pH of 2.8 and is collected in a tank 7a provided for this purpose. The two milk fractions obtained in this way and contained in the tanks 7 and 7a are then mixed together.

This mixing is performed carefully under accurate flow and stirring conditions in order to obtain milk having a pH below the isoelectric point and containing casein in solution only. This milk, e.g. at pH 4.5, is stored in a tank 8 from which it may be extracted in order to be subjected to conventional processing for separating the casein and the whey. Casein obtained in this way retains a major portion of its initial properties. It is thus of higher quality than casein that has been obtained conventionally by the acid method, and it may constitute a substitute for rennin casein (the enzyme method) e.g. in the cheese industry relating to processed cheeses.

In addition, the whey resulting from casein separation is advantageous in that it is partially deionized. It is believed that about 45% of inorganic salts are extracted by the method of the invention, and this is most advantageous compared with the superionized whey that results from the conventional acid method.

As a first conclusion, recalling that about 80% of the casein produced in Europe is obtained by the acid method, this first stage of the method of the invention constitutes a commercially advantageous alternative to producing casein by the acid method, particular since the Authorities would like to see the quantities of acid method casein reduced.

Although this method already shows advantages over the prior art, it can be extended to show up additional qualities.

A first one of these additional qualities lies in the fact that it makes it possible to obtain milk well below the isoelectric point, e.g. between pH 4 and pH 2.8.

For example, the entire batch contained in the tank 1 may be caused to flow through and be recycled through the three-compartment electrodialyzer ED1 only, until the pH in the tank 6 reaches 2.8. Under these circumstances, the flow rate through the installation should be controlled so as to avoid clogging on passing through the isoelectric point of the milk during acidification. Under such circumstances, the installation shown in FIG. 1 need not include a second electrodialyzer, assuming that the desired product is milk having a pH of 2.8.

Figure 2:
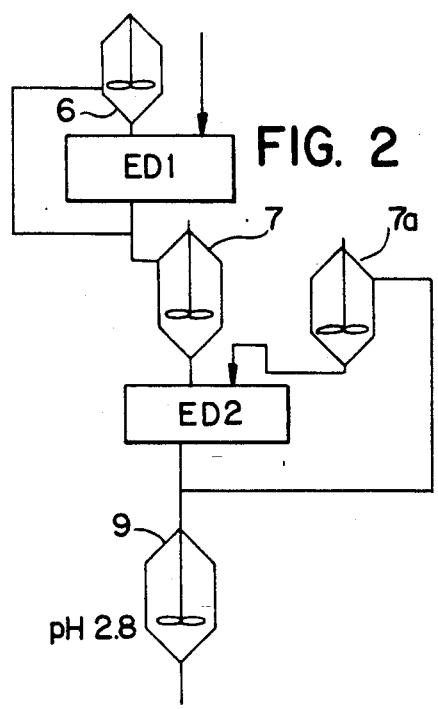
FIGS. 2 and 3 are diagrams showing ways in which the invention can be used to obtain acid milk having a pH of around 2.8.

FIG. 2 shows an alternative installation having only one electrodialyzer and having the advantage of being easier to control. The entire processing batch passes through the first electrodialyzer ED1 and then through the second electrodialyzer ED2 in order to obtain very acid milk in tank 9. While operating in this way, using two stages of electrodialysis, the risks of the system clogging as it passes through the isoelectric point of casein in the electrodialyzer ED2 are greatly reduced. It is possible to operate progressively so as to recycle milk below the isoelectric point, thereby dissolving any deposits that may have formed in the cells on passing through the isoelectric point. The operation of this two-stage electrodialysis merely requires the flow rate parameters to be under control and the variation in the pH to be monitored on a permanent basis.

Figure 3:
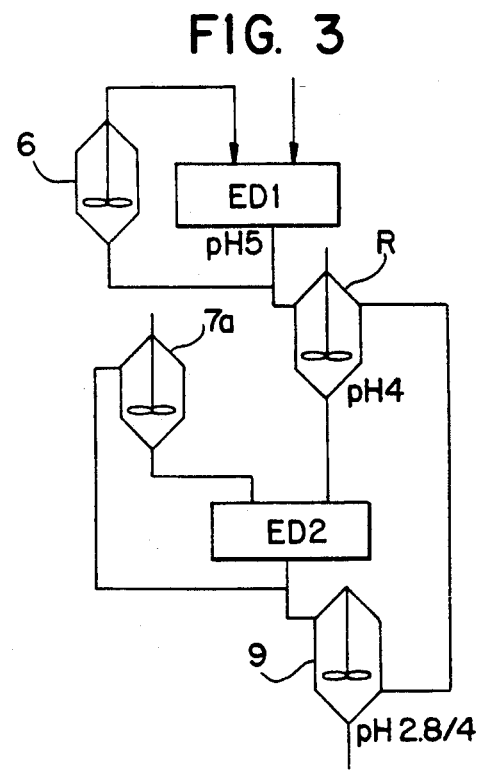

FIG. 3 is an alternative to FIG. 2 and thus also constitutes an installation having a single electrodialysis stage for acidifying a batch to a pH of less than the isoelectric point of casein. This alternative provide increased safety over that shown in FIG. 2, but it requires an installation which is more complicated. Thus, at the outlet from electrodialyzer ED1, milk at pH 5 is mixed in a tank R with a fraction of the milk at pH 2.8 from electrodialyzer ED2 taken from processing the preceding batch. The isoelectric point is thus passed through upstream from electrodialyzer ED2 within the tank R. The relative quantities mixed are such that the milk entering ED2 is at around pH 4. The risk of precipitation within ED2 is thus limited to the first batch being treated. The two milks are mixed particularly carefully in order to prevent any casein coagulation since that would spoil the casein and this would show up during subsequent processing.

Thus, using the method of the invention, it is possible to obtain milk having a pH of 2.8. This characteristic is advantageous in several respects. Firstly, since cation exchange has not taken place, the milk is highly deionized. The deionization performed by this electrodialysis is believed to be about 60% to 65%. In addition, milk which is this acid is well protected microbiologically while its proteins are in a hydrophilic state enhancing their protection, in particular against thermal shock.

Figure 4:
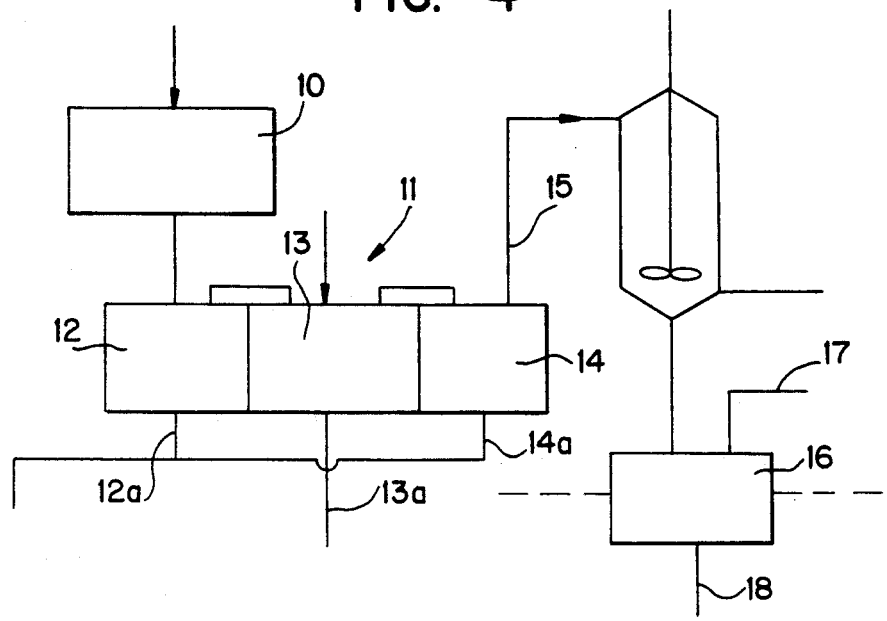
FIG. 4 is a diagram showing the stage during which the acid milk is filtered in order to separate its various constituent parts.

Such acid milk may therefore be subjected to heat treatment for sterilization purposes. FIG. 4 shows a heat treatment unit 10 which is fed with milk at a pH of 2.8.

The batch of sterilized milk is then conveyed to a filter unit 11 for separating the casein and the whey in selective manner. In a first stage 12, the acid milk is subjected to ultrafiltering from which lactose is obtained as the filtrate 12a. Microfiltering and/or diafiltering of the residue from stage 12 is/are performed in a second stage 13 from which serum proteins may be recovered at 13a. It should be observed that the prior ultrafiltering makes it possible to obtain a filtrate 13a having a high concentration of serum proteins (about 35% of total dry matter) which can be used commercially without further processing. Finally, the microfiltering and/or diafiltering is followed by a second stage of ultrafiltering 14 for extracting further lactose from the casein at 14a. The residue from the stage 11 is thus essentially constituted by soluble casein having a pH in the range 2.8 to 4. This casein may be considered as being in its natural state since the processing to which it has been subjected has not modified its original structure.

It is directly of commercial value. Firstly, it constitutes a product that can be used as an additive for milk, thereby making it possible to avoid processing nitrogen-poor milk by ultrafiltration prior to cheesemaking.

It suffices merely to add this casein to such milks that need enriching in order to considerably improve their yield in cheesemaking. Such natural state casein constitutes an immediate solution to problems of milk standardization which are poorly solved at present by the ultrafiltering techniques used. Ultrafiltering milk is difficult to perform given that membranes are frequently clogged, and that there is always a danger of fermentation and of multiplication of microbes contained therein, with the resulting permeates being of little commercial value.

It may be advantageous to have casein that has been neutralized. This can be done by passing the residue 15 (casein with a pH of 2.8 to 4) through a conventional two-compartment electrodialyzer 16 enabling residual anions and hydronium anions to be extracted from the medium. Since this electrodialysis has the effect of raising the pH, the isoelectric point of casein is reached, and it is appropriate to pass rapidly therethrough in order to avoid precipitation within the electrodialyzer. It is advantageous, at this moment, to add sodium hydroxide (or some other base) 17 into the electrodialyzed flow which, by increasing the electrical charge improves the conductivity of the medium while enabling any possible precipitation on the membranes of the electrodialyzer 16 to be dissolved. It may be observed that the quantity of added sodium hydroxide is minimized given the low degree of ionization of the casein solution at pH 4.5, and the added sodium ions are immediately removed from the solution by the electrodialyzer. The output product 18 from this electrodialyzer constitutes neutralized and soluble casein which may be dried and which is suitable for incorporation in the form of a powder in any milk that needs enriching in nitrogen-containing matter since it has retained its original properties.

Figure 5:
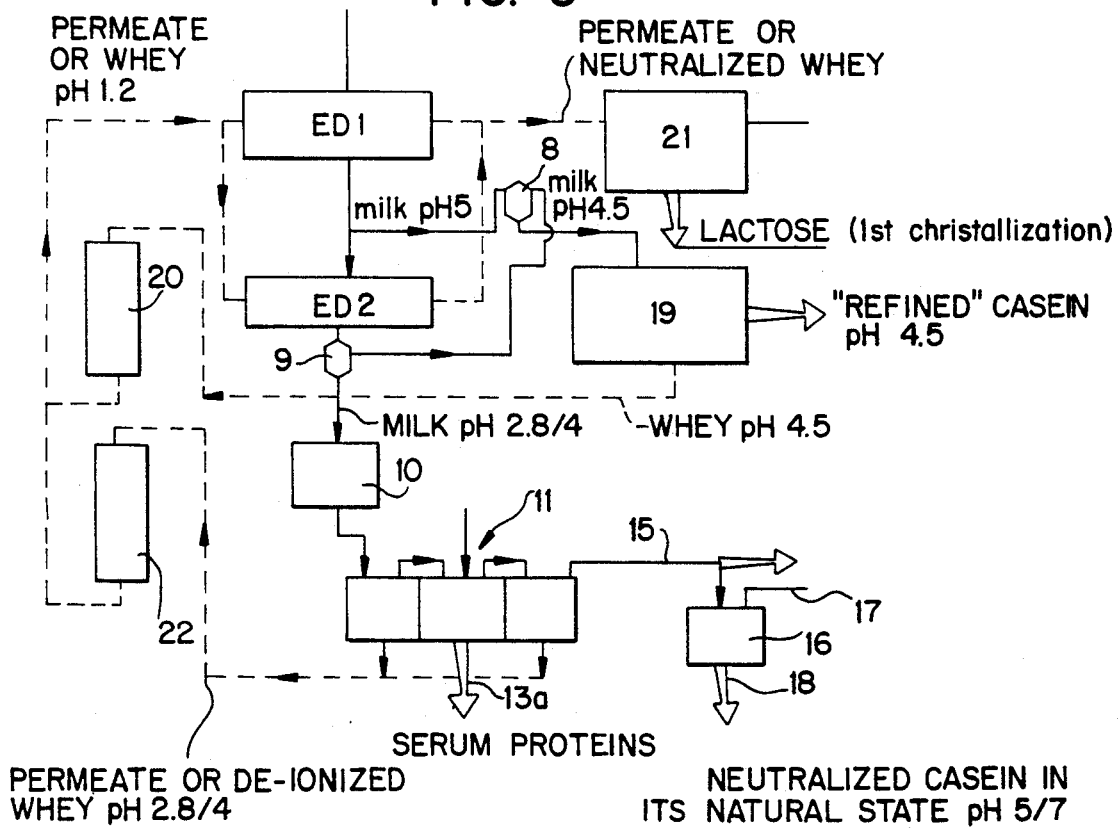
FIG. 5 is an overall block diagram of an installation for implementing the method of the invention.

FIG. 5 is a diagram showing the various stages of the method of the invention, which stages may be implemented selectively as explained above. This figure shows some items that have already been described, and they are given the same references.

Thus, 19 represents a unit for processing milk with a pH of 4.5 as it leaves the tank 8 (FIG. 1) for separating casein from whey. The casein obtained at pH 4.5 is "refined" casein which may be used, for example, as a substitute for rennin casein. The partially deionized whey at pH 4.5 is passed over a strong cationic resin 20 which completes deionzation by cation exchange and which acidifies the whey to a pH of about 1 to 2. This acid whey is then used as an acid medium in one and/or the other of the electrodialyzers ED1, ED2 where it looses its anions and is progressively neutralized. Thus, after passing through these three-compartment electrodialyzers, neutralized and deionized whey is made available which can be processed in a unit 21 for recovering lactose.

When producing casein in its natural state by the method of the invention (FIGS. 2 and 3) the deionized acid permeate (pH 2.8 to 4) from which the serum proteins have been removed is also conveyed over a strong cationic ion exchange resin 22 whereby the last remaining cations are extracted from the whey and its pH is reduced to the range 1 to 2. Advantageously, an acid flow is then available which is injected into the compartments 4 (FIG. 1A) of one and/or the other of the three-compartment electrodialyzers ED1 and ED2. The whey is thus deanionized and neutralized. It is then processed in a unit 21 for extracting lactose therefrom in a form which is immediately ready for commercial use (first crystallization lactose) and can be used in the pharmaceutical or the parapharmaceutical industry, for example.

Naturally, FIG. 5 is diagrammatic and does not show means for intermediate recirculation and storage of the various flows. Nor does it show the means implemented for conserving the whey from filter stage 11 under the sterile conditions obtained by the processing of stage 10, and all along its deionizing and neutralizing transit path.

I claim:

1. A method of processing a batch of skimmed milk in order to extract it various constituent parts, the method including a first stage of maintaining the milk at a temperature sufficiently low to limit microbiological development and acidifying the milk by electrodialysis in a three-compartment electrodialyzer and a second stage of extracting casein from the milk, wherein acid medium flowing through the three-compartment electrodialyzer is an acid permeate at a pH in the range of 1 or 2 and derived from the milk after extracting the casein.

2. A method according to claim 1, wherein partially deionized whey left after extracting the casein is passed over a strong cationic ion exchange resin for further decationization and is then used as an acid agent in the electrodialyzer in which the whey is deanionized.

3. A method according to claim 1, wherein the milk acidification stage is performed in two electrodialysis stages, the first stage being carried out to bring all of the batch to a pH of about 5, and the second stage receiving at least a fraction of the batch from the first stage and bringing it to a pH of about 2.8, and wherein the two products from the two electrodialysis stages are mixed in order to obtain milk having a pH in the vicinity of the isoelectric point of casein where the casein has the tendency to flocculate.

4. A method according to claim 1, wherein the entire batch is caused to flow through at least two electrodialysis stages, and wherein prior to causing the batch of milk from the first electrodialyzer to flow through the second electrodialyzer, the batch of milk is mixed with a portion of the previous batch of milk to flow through the second electrodialyzer such that the pH of the milk entering the second electrodialyzer is below the isoelectric point of casein where the casein has the tendency to flocculate.

5. A method according to claim 4, including a second stage of processing the milk acidified to pH 2.8, the second stage consisting in separating out whey contained in the milk by filtering.

6. A method according to claim 5, wherein the separation stage includes at least two ultrafiltering stages with an intervening microfiltering and/or diafiltering stage from which the permeate contains serum proteins.

7. A method according to claim 5, including a stage of microbiological sterilization prior to separating out the whey contained in the milk by filtering.

8. A method according to claim 5, wherein the permeate from the separation by filtering stage is deionized by passing firstly over a strong cationic resin and secondly through the electrodialyzer used for acidifying the milk.

9. A method according to claim 5, wherein the residue from the separation by filtering stage is neutralized by causing said residue to flow through a two-compartment electrodialyzer and by adding a base as said residue passes through the isoelectric point of casein where the casein has the tendency to flocculate.

* * * * *